Patented June 5, 1928.

1,672,788

UNITED STATES PATENT OFFICE.

HEINRICH SPECKETER, OF GRIESHEIM-ON-THE-MAIN, GERMANY, ASSIGNOR TO I. G. FARBENINDUSTRIE AKTIENGESELLSCHAFT, OF FRANKFORT, GERMANY.

PRODUCING ALUMINA FREE FROM IRON.

No Drawing. Application filed September 17, 1925, Serial No. 57,027, and in Germany October 13, 1924.

This invention relates to the production of alumina from potter's earth or other aluminous material. In the German Patent No. 357,900, filed by Chemische Fabrik Griesheim-Elektron, I have described a process for producing alumina almost free from iron which process consists in extracting potter's earth or other aluminous material by an acid, preferably hydrochloric acid, reducing the ferric salts, contained in the extract, to ferrous salts, evaporating the solution, decomposing the residue by heat and separating the resulting insoluble alumina from the ferrous salt by extraction with water.

In putting this process into practice drawbacks have appeared resulting from the fact that it is difficult to accomplish the thermic decomposition in the absence of air as required, inasmuch as no metal is known for making receptacles, for instance muffles, in which hydrochloric solutions can be heated from the outside without the receptacles being attacked.

Now I have found by thorough experiments that the above-mentioned process may be carried out in a technically and economically more simple manner, by modifying the process to that effect that the thermic decomposition of the aluminum chloride is performed while keeping the material to be decomposed permanently in direct contact with hot gases having no oxidizing, but in fact reducing, properties with respect to ferric oxide.

This improvement was made possible by the inventor's newly acquired knowledge which taught him that, without endangering the quality of the product, the temperature may be raised considerably above 300° C., as ferrous chloride is stable, in reducing gases, even above red heat. Therefore it is not necessary to restrict the temperature to narrow limits, and the temperature may, if required, be adjusted in such a manner that ferric oxide, should it be present, is again removed. Furthermore, at temperatures exceeding 300° C. the decomposition of aluminum chloride becomes perfect, so that loss of alumina is avoided.

My improved process is carried out for instance in such a way that the solution obtained by extracting potter's earth with hydrochloric acid is reduced by introducing sulphuretted hydrogen or another reducing agent. The solution is preferably evaporated, the access of air being avoided, in a spray-tower provided with an acid-proof lining similar to the Gaillard tower in which the solution is suitably distributed, or the solution may be decomposed by heat in a revolving drum, the production of the heating gases required for the decomposition being in every case conducted in such a manner that a certain (although slight) excess of carbon monoxid, hydrogen or other reducing gas is contained therein. The combustion of the heating-material can easily be conducted in the direction required, for instance, by means of flameless combustion, by which the removal of remnants of oxygen is secured. In this manner the decomposition is effected with the most favorable utilization of heat and by means of simple and durable apparatus. By extracting the reaction product by means of water with the addition of a small quantity of hydrochloric acid a solution is obtained which contains almost the whole of the iron, and an alumina remains containing iron compounds corresponding to about 0.2 per cent $Fe_2O_3$. If desired, this product may be further freed from ferric oxid by heating the same in a current of chlorine or with air containing hydrochloric acid. The resulting ferric chloride may be utilized or decomposed by heat to ferric oxid and hydrochloric acid.

I claim:—

1. Process of recovering alumina from a mixture consisting essentially of aluminium chlorid and ferrous chlorid which comprises heating the mixture in the presence of sufficient water to provide for the hydrolysis of the aluminium chlorid to alumina and in the presence of a reducing gas capable of preventing the oxidation of the ferrous iron to ferric iron to a temperature sufficient to accomplish said hydrolysis but insufficient to decompose or volatilize the ferrous chlorid, and selectively dissolving the ferrous chlorid out of the resulting mass.

2. In the process of producing alumina, almost free from iron, by extracting potter's earth or similar aluminous material, with hydrochloric acid, reducing the ferric salt to ferrous salt, evaporating the ferruginous aluminum salt solution, decomposing the residue by heat and separating the alumina from the soluble ferrous salt, the improvement consisting in carrying out the decomposition by heat in direct contact with hot reducing gases at temperatures at which reoxidation of the ferrous salts formed to ferric salts is prevented, and, after washing out the ferrous salt, heating the extracted residue in a gas current adapted to volatilize the iron in the form of ferric chloride.

3. In the process of producing alumina, almost free from iron, by extracting potter's earth or similar aluminous material, with hydrochloric acid, reducing the ferric salt to ferrous salt, evaporating the ferruginous aluminum salt solution, decomposing the residue by heat and separating the alumina from the soluble ferrous salt, the improvement consisting in carrying out the decomposition by heat in direct contact with hot reducing gases at temperatures at which reoxidation of the ferrous salts formed to ferric salts is prevented, and, after washing out the ferrous salt, heating the extracted residue in a current of chlorine.

In testimony whereof I affix my signature.

HEINRICH SPECKETER.